United States Patent [19]

Satoh et al.

[11] Patent Number: 4,523,304
[45] Date of Patent: Jun. 11, 1985

[54] OPTICAL DATA RECORDING AND REPRODUCING APPARATUS

[75] Inventors: Isao Satoh, Neyagawa; Tomio Yoshida, Katano; Shunji Harigae, Neyagawa; Kenji Koishi, Suita, all of Japan

[73] Assignee: Matsushita Electric Industrial Co., Ltd., Osaka, Japan

[21] Appl. No.: 368,361

[22] Filed: Apr. 14, 1982

[30] Foreign Application Priority Data

Apr. 17, 1981 [JP] Japan .................................. 56-58927
Oct. 2, 1981 [JP] Japan ................................. 56-157841

[51] Int. Cl.$^3$ ............................................... G11B 7/00
[52] U.S. Cl. ......................................... 369/32; 369/64; 369/98; 358/335; 358/336; 358/342
[58] Field of Search ..................... 369/64, 32, 43, 44, 369/47, 93, 98, 97, 275; 358/335, 336, 342

[56] References Cited

U.S. PATENT DOCUMENTS 4,142,209 2/1979 Hedlund et al. .................. 369/47 X
4,370,740 1/1983 Hirata ............................... 369/47 X Primary Examiner—Robert L. Richardson
Attorney, Agent, or Firm—Stevens, Davis, Miller & Mosher

[57] ABSTRACT

A modulation and demodulation system for an optical data recording and reproducing apparatus is disclosed in which, in an optical disc having an optical guide track and capable of recording and reproducing optically, the guide track is divided into a plurality of data sectors and the recording or reproduction or reading is effected by data sector. The modulation system for the data field for recording the data is different from that for the identification field containing identification data such as a track address and a sector address in such a way that the identification field is reproduced at high reliability and high demodulation speed while at the same time recording data at high density in the data field.

13 Claims, 23 Drawing Figures

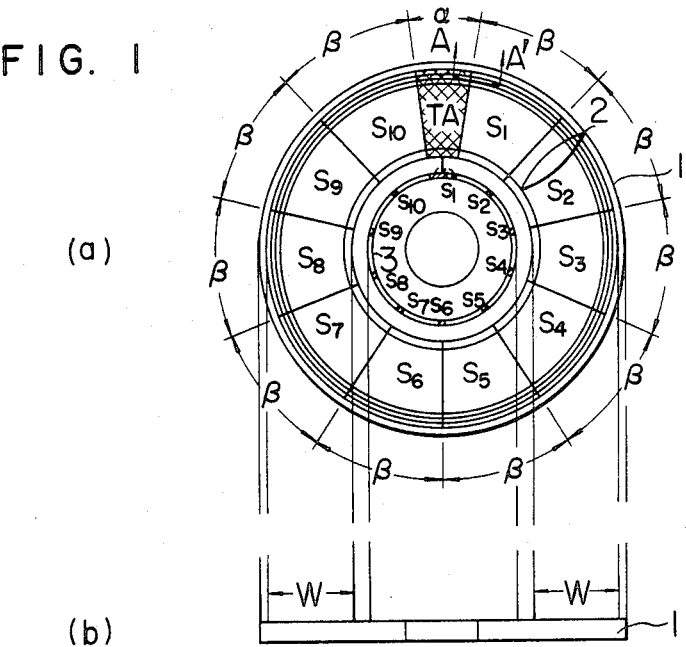
FIG. 1
(a)
(b)
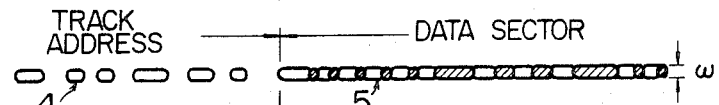
FIG. 2(a) TRACK PLAN VIEW
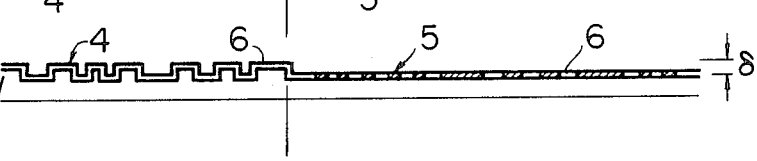
FIG. 2(b) TRACK SECTIONAL VIEW
FIG. 2(c) REPRODUCTION SIGNAL
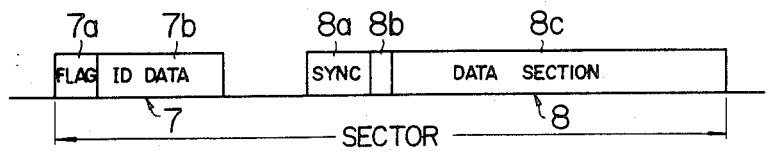
FIG. 3

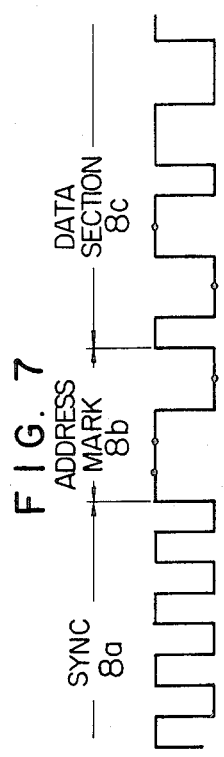
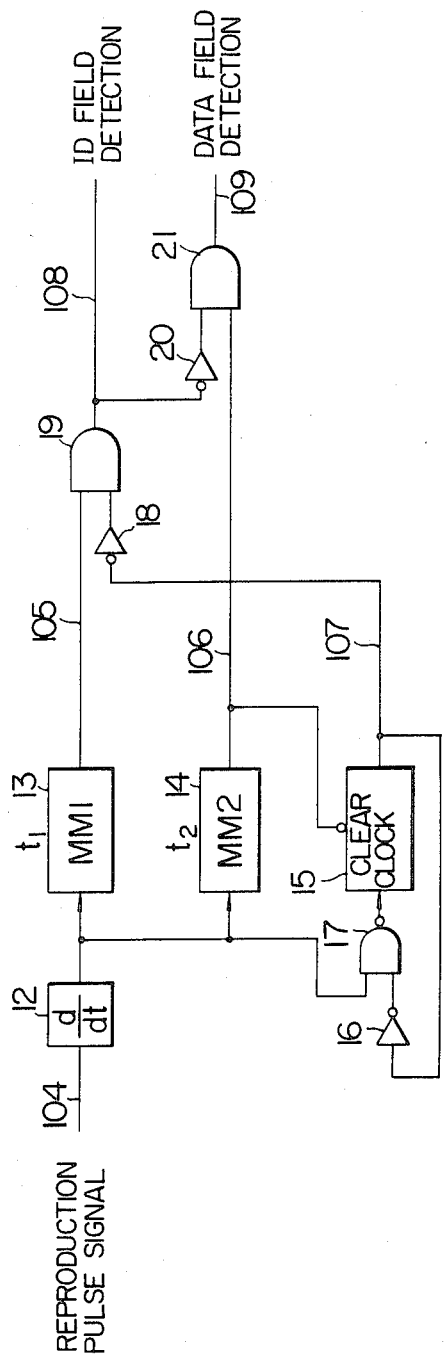

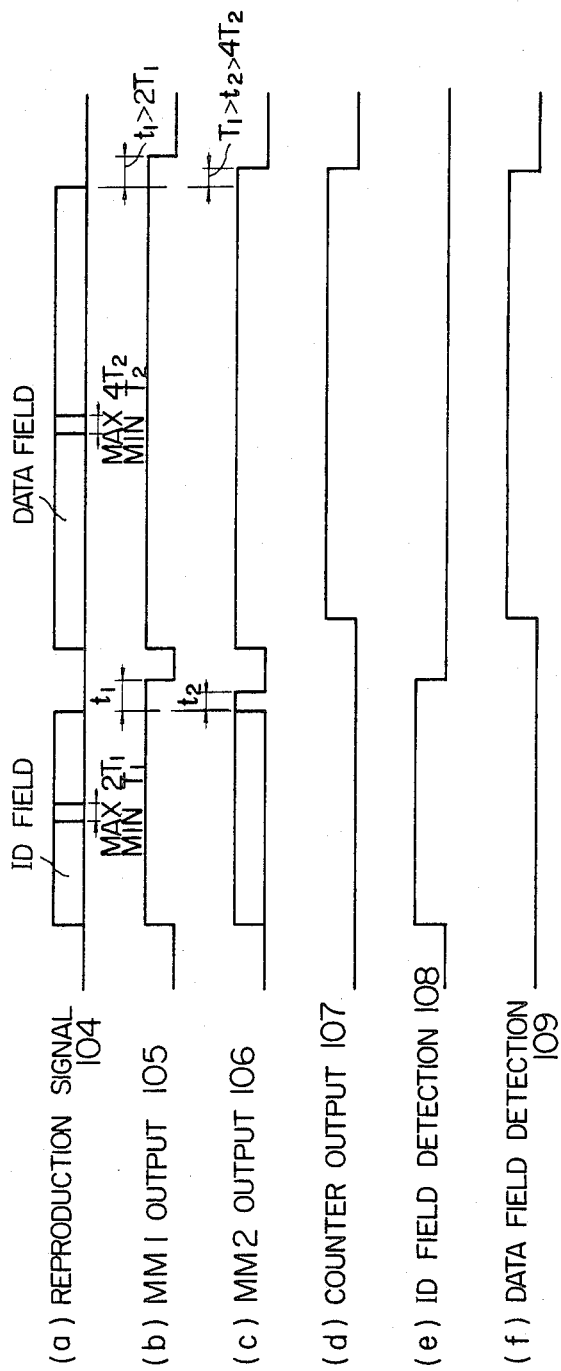
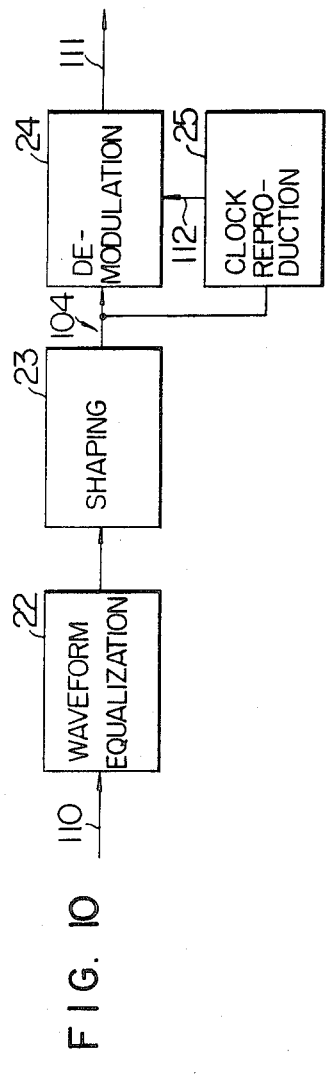

OPTICAL DATA RECORDING AND REPRODUCING APPARATUS

The present invention relates to an optical data recording and reproducing apparatus.

An optical disc coated with a recording material by spraying or vapor deposition, is rotated, and a tiny spot of laser light beam, which is focussed so that the diameter is less than 1 micrometer is applied to the optical disk. The intensity of the laser light is modulated by a recording signal so that recording of a digital signal can be effected as an optical characteristic change such as a variation in refractive index, for instance, a phase variation caused by concave-convex portions of the optical disc, or variations in a reflection factor or in transmittance by light and shade variations, or variations produced by the formation of holes. The optical characteristic change on the disk will be detected to reproduce prerecorded information. For example, an optical video disc is well known for its ability to record signals with a high density using the above-mentioned technique.

This technique of recording signals is also used by an apparatus for producing a video disc master.

The recording signals may include a video signal, a sound signal or a digital signal.

In the optical recording and reproducing apparatus described above, signals are recorded by radiating a laser beam on a recording material on the disc thereby to fuse and evaporate the light-radiated portion of the disc or to change the reflection factor or the transmission factor of the recording material. In other words, thermal energy of the laser beam is generally utilized to change the optical characteristics of the recording material.

Some difficulties are encountered when a signal is recorded at high density in the above-mentioned disc capable of optical recording and reproduction with a simple apparatus.

First, the vibration of the apparatus poses a problem when the pitch of the recording track is reduced. Another problem is a feed variation or nonuniform feeding of a feed mechanism including a screw and a motor for effecting the relative feed of an optical head with respect to the disc. Japanese Patent Laid Open Publication No. 109601/78 discloses an example of a method of recording at high density in small track pitches with such a simple apparatus as mentioned above, in which the disc is provided with an optically detectable guide track subjected to a well-known tracking control, and signals are recorded or reproduced along or on this guide track. By using a guide track optically detectable as mentioned above, it is possible to produce a high-density optical recording and reproducing apparatus affected less adversely by the vibration of the apparatus, feed variations of the feed mechanism or disc eccentricity.

This guide track is selected according to the nature of the data or signal recorded and generally takes a spiral or concentric form with respect to the disc center.

In order to permit the recording/reproduction of digital data at a given location, each track is provided with a specific track address data and is divided into data sectors as recording or reproduction units for digital data. For this purpose, an identification field (ID field) is formed in the track for identifying a track address and the data sectors. The ID field is formed on the optical disc master at the same time as the groove-like guide track, and this master is duplicated on an optical disc base material as a replica by a stamper technique. The optical disc duplicated with the guide track and the identification field is deposited with a recording material by evaporation and covered with a protective layer thereby to produce an optical disc. The optical disc may develop a defect due to a flaw or dust during the processes of production of the optical disc master, a replica, or deposition by evaporation and forming the protective film, with the result that it causes an error dropout rate in the order of $10^{-3}$ to $10^{-4}$. A recording system highly resistant to this error is desired for the ID field. Also, the ID field, the length of which affects the data capacity of the data field for recording digital data in the optical disc, must be as short as possible and requires a modulation system highly resistant to errors. On the other hand, the ID field is not used for recording digital data and therefore reduces the data recording efficiency of the optical disc.

For these reasons, a recording system for an ID field and a data field for recording digital data is desired which is high resistant to defects in the optical disc and does not reduce the data recording efficiency.

Accordingly, it is an object of the present invention to provide a recording and reproducing system in which the identification field containing the identification data such as the tract address and sector address and the data field for recording digital data are recorded by different modulation methods, thus reproducing an identification field with high reliability and with a high decoding rate on the one hand and recording digital data in the data field with a high density on the other hand.

Another object of the present invention is to provide a clock reproduction system for reproducing the data field in a stable manner against time variations caused by an eccentricity of the optical disc or variations of rotation.

The above and other objects and features of the present invention will become apparent from the following detailed description taken in conjunction with the accompanying drawings, in which:

FIG. 1 consisting of (a) and (b) is an outside view of an optical disc used for the present invention;

FIG. 2 consisting of (a)-(c) is a diagram for explaining the construction of the groove-like guide track of the optical disc;

FIG. 3 is a diagram showing a signal format of a sector;

FIGS. 4 and 5 each FIG. consisting of (a)-(c), show an embodiment of modulation signals of the ID field and the data field;

FIG. 7 shows a waveform of the modulation signal for the data field;

FIG. 8 is a block diagram showing an embodiment of a separator circuit for the ID field and the data field;

FIG. 9 shows signal waveforms produced at various parts in FIG. 8;

FIG. 10 is a block diagram showing a data demodulation circuit;

Figure 4:
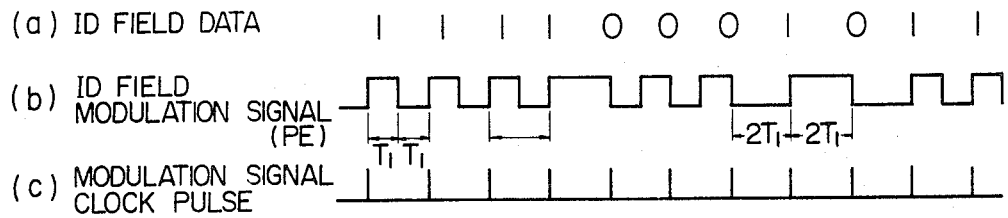

An example of an optical disc used in the present invention is shown in FIG. 1. An optical disc 1 in FIG. 1 comprises data sectors $S_1$ to $S_{10}$ for recording data and a track address area TA. Spiral or concentral guide tracks are cut in the optical disc 1. FIG. 1 shows an example of concentric tracks 2 cut in the effective recording area W. Each track 2 is equally divided into data sectors $S_1$ to $S_{10}$ at an angle $\beta$, so that recording and reproduction are effected by sector. Each sector is distinguished by the sector marks $s_1$ to $s_{10}$ and an index mark i arranged on the concentric circle 3 on the inside of the optical disc 1. The index mark i is aligned on the track 2 in the same angle $\alpha$ as the track address area TA and is used for detection of the track address TA and the sector positions.

FIG. 2 is an enlarged view of the boundary A—A' of the track address TA of the track 2 and the sector $S_1$. FIG. 2(a) is a sectional view of the track 2, and FIG. 2(b) is a sectional view thereof. The track 2 includes the track address portion 4 and a guide track 5 making up the sectors. The guide track 5 is in the form of a flat groove having the depth of $\delta$ and width of $\omega$ extending along the disc periphery. The groove depth $\delta$ is approximately ⅛ of the wavelength irradiating beam to facilitate production of a tracking signal by a tiny spot of laser light. The track address section 4 is cut at the time of production of the disc master and copied at the same time by the well-known stamper technique. An amorphous metal film 6 is deposited by evaporation on the address section 4 and the guide track 5 to form a recording layer. The heat mode recording of data in the optical disc is well known and is performed by forming holes in the recording layer 6 or by changing the reflection factor. A recorded data or signal is read by the change of intensity of the reflected light at an optical power of low level below the light-sensitive threshold of the recording layer 6 as shown by a reproduction signal of FIG. 2(c). The track address section 4 is recorded with track address data by a phase construction. The minute spot light of 1 μm in diameter is refracted by the phase variation at the concave-convex portions of the track address section 4 and thus is reproduced by the variation of the intensity of the reflected light in the same manner as the sectors. The track address section 4 and the guide track 5 do not have the same level of reproduction amplitude since the recording method is different.

An embodiment of the construction of the sector signal according to the present invention is shown in FIG. 3. A sector is comprised of an identification field (ID) 7 and a data field 8. The ID field 7 is recorded with identification data for the track and sector such as a track address and a sector address.

The ID field is cut at the time of production of the disc master and includes a flag 7a and an identification data 7b. The flag 7a is a special bit train for identifying the start of the ID field 7. The ID field 7 is so constructed as not to require any special pull-in data train for synchronization or clock reproduction circuit, and thus, a modulation system such as FM or PE modulation is employed in that it always includes one clock pulse in the bit cell of the modulation signal.

On the other hand, the data field 8 employs a modulation system different from that for the ID field 7 and does not always include a clock pulse component in the bit cell of the modulation signal. It is a modulation system having what is called a missing clock such as MFM modulation or $M^2FM$ modulation. Thus the clock reproduction is required to be effected by a PLL (phase locked loop), and the data field 8, which performs the pull-in of the PLL, has a synchronization section 8a. The data section 8c and the synchronization section 8a of the data field 8 are distinguished by the address mark 8b. The address mark 8b is most suitably a combination of special bit trains not included in the data section 8b or the sync section 8a.

FIG. 4 shows signal waveforms of the ID field 7 subjected to PE modulation. The identification data of the ID field 7 is modulated in such a way as to rise at the center of the data "1" and falls at the center of the data "0". The ID field modulation signal in (c) of FIG. 4 always has a clock pulse at the bit cell intervals of $2T_1$ as shown and has no missing clock portion. It is thus possible to easily reproduce data by use of the rise pulse of the modulation signal.

Figure 5:
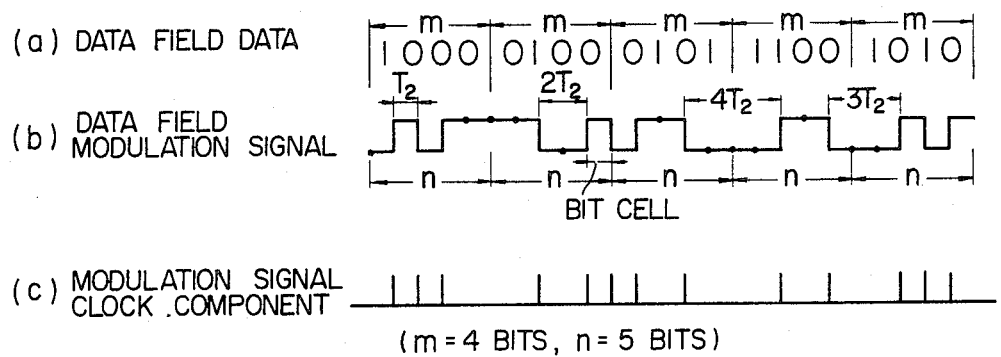

FIG. 5 shows an embodiment of the modulation signal for the data field 8. The data train of the data field 8 shows an example of an LDC (low disparity code) subjected to NRZ modulation by conversion of n bits into an n-bit code word. FIG. 5 shows the case in which m is 4 bits and n is 5 bits. FIG. 5 In (a) shows data field data, and the data field modulation signal of (b) in FIG. 5 includes a missing clock portion not including a clock pulse in the sections of $2T_2$, $3T_2$ and $4T_2$ ($T_2$: code bit cell width) as shown in (c) in FIG. 5. The reproduction of the clock pulse in this missing clock section is required to be performed by a PLL.

Each sector recorded by the modulation system explained with reference to FIGS. 4 and 5 has the effects and features as mentioned below.

The ID field, in the absence of a missing clock, does not require a special clock reproduction circuit, that is, a synchronization section for the clock reproduction, so that the modulation frequency is reduced without reducing the format efficiency, thus making possible a reliable ID field reproduction resistant to dropouts. Also, the rapid demodulation permits a shorter interval with the data field, resulting in a high-density format.

Further, the data field, separate from the ID field, can be increased in density and employs a modulation system different from the ID field, thereby leading to the advantage that a strong sync section, and an error detection and correction section may be used without reducing the format efficiency.

Figure 6:
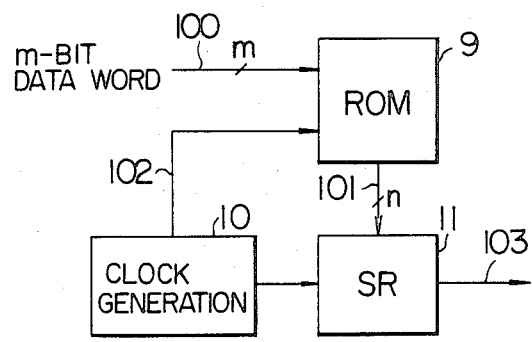
FIG. 6 is a block diagram showing a data modulation circuit of the data field.

FIG. 6 shows a block diagram of a modulation circuit for the data field 8. As shown in FIG. 5, the data is applied in the form of data words divided into m bits as an address signal 100 of the code conversion ROM 9, converted into a code 101 of n bits, and then produced as a series modulation signal 103 from a shift register 11 by a clock 102 of a clock generator circuit 10.

FIG. 7 shows an example of a code word accommodated in the code conversion ROM of FIG. 6, which is used for the address mark 8b for the special purpose of distinguishing the sync section 8a and the data section 8c. FIG. 7 shows an example involving m of 4 bits (m=4 bits) and n of 5 bits (n=5 bits). In this case, $2^4=16$ combinations are selected from $2^5=32$ combinations. The remaining codes are used for the above-mentioned special purposes such as an address mark. There are twenty 5-bit code words of which the difference between the numbers of "0" and "1" is ±1, from which 16 code words corresponding to the data words are removed to leave four code words. According to the present invention, a bit train at least one of "11100" and "11000" of the four code words is used as an address mark so that "0" or "1" continues with at most four-fold bit cell interval in the bit train of code words, thus dampening the expansion of the spectrum of the data modulation signal.

FIG. 8 shows an embodiment of a separator circuit in which the modulation signal for the ID field and the modulation signal for the data field are separated satisfactorily. FIG. 9 shows signal waveforms produced at various parts of the circuit of FIG. 8.

In the modulation signal waveforms of FIGS. 4 and 5, assume that $T_1$ is a minimum bit reversal interval of the modulation signal for the ID field and $4T_2$ is a maximum bit reversal interval of the modulation signal for the data field. The bit rate is set in such a manner that the relation holds $T_1 > 4T_2$. By doing so, the reproduction pulse signal 104 obtained by waveform equalization and pulse shaping of the reproduction signal from the optical disc is differentiated at the differentiator circuit 12, and the rise and fall of the reproduction signal are detected. This signal is applied to monostable multivibrators 13 and 14 of retrigger type and a counter 15 thereby to separate the signals of the ID field and the data field from each other. The pulse duration $t_1$ of the monostable multivibrator 13 is selected in such a manner that $t_1$ is larger than $2T_1$, and as shown in (b) in FIG. 9, an output 105 of high level is produced while the signal for the ID field and the signal for the data field are produced. On the other hand, the monostable multivibrator 14 is set in such a manner that a pulse duration $t_2$ is smaller than $T_1$ and larger than $4T_2$, thus producing an output 106 which include both pulses of "high" and "low" in the case of the signal for the ID field but which makes up a "high" signal for the data field.

The counter 15 is cleared by the output 106 of the monostable multivibrator 14 and is for counting up the output of the differentiator circuit 12 as a clock input. Taking advantage of the fact that the data field does not include a pulse train more than $T_1$ in pulse duration, the counter 15 counts up the sync portion of the data field and detects the data field at more than a certain value of the counter output 107. (FIG. 9 in (d)) The inverter 16 and the NAND gate 17 make up a logic circuit for prohibiting the count when the output 107 of the counter 15 is at high state.

The ID field detection output 108 of (e) in FIG. 9 is an output of the AND gate 109 supplied with the output 105 of the monostable multivibrator 13 and the output 107 of the counter 15 as inverted by the inverter 18. The data field detection output 109 of (f) in FIG. 9, on the other hand, is an output of the AND gate 21 supplied with the output 106 of the monostable multivibrator 14 and the ID field detection output 108 as inverted by the inverter 20.

FIG. 10 shows a block diagram of a data demodulation system including a waveform equalization circuit 22, a shaping circuit 23, a demodulation circuit 24 and a clock reproduction circuit 25. The waveform equalization circuit 22 is for correcting the frequency deterioration and waveform deformation of the optical disc reproduction signal 110 caused by the frequency characteristic of the optical disc and the optical system. The reproduction signal equalized in waveform is converted into a pulse signal at the shaping circuit 23 and applied as a reproduction pulse signal 104 to the demodulation circuit 24 and the clock reproduction circuit 25. The clock reproduction circuit 25 forms a PLL (phase lock loop) in such a manner that a clock sync is established rapidly at the sync section 8a shown in FIG. 3 and the change of the rotational speed of the disc is stably followed up. The demodulation circuit 25 is for demodulating and producing the data 111 by sampling the output 104 of the shaping circuit 23 by the clock 112 reproduced at the clock reproduction circuit 25. Thus if the clock is ill-timed, "0" may be sampled as "1" leading to a decoding error.

The optical disc shown in FIG. 1, in particular, reproduces the track address area TA and the sectors $S_1$ to $S_{10}$ in a burst manner, and therefore, in the clock reproduction system for phase-locking the oscillation output of an ordinary voltage control oscillator (VCO) and the edge pulse of the reproduction pulse signal, (a) In view of an unrecorded part existing, the VCO runs free during this period and the oscillation frequency drifts at specified numbers of PLL and LPF.

(b) If there is a burst-like dropout such as a flaw or defect of the optical disc or the track address area (TA) of the modulation frequency or modulation system different from the sectors, the VCO follows the edge of such a false signal, with the result that the operating range of the PLL is exceeded, thus requiring a long time for the clock pull-in for the succeeding sector. In this way, the pull-in for clock sync at the sector requires an excessive time, thus making it impossible to establish a clock sync at the period of the sync section 8a shown in FIG. 3.

Figure 11:
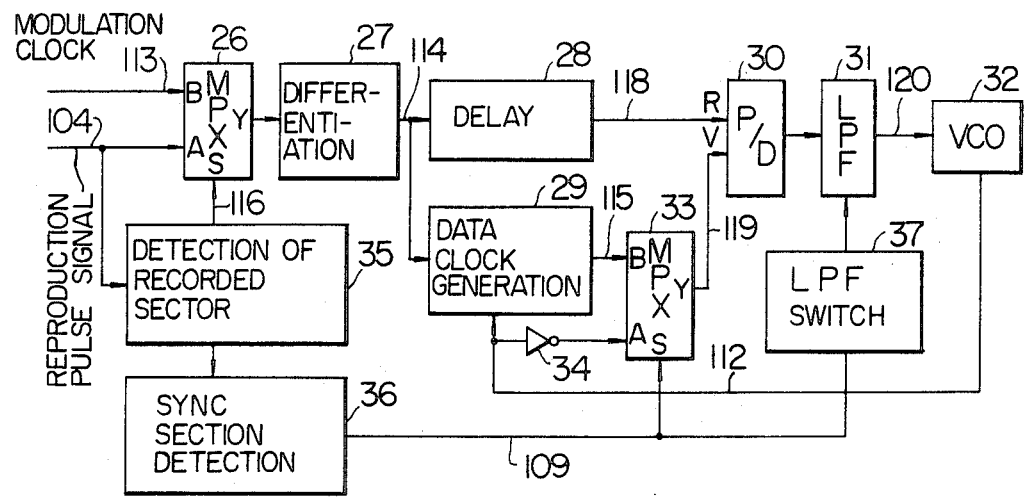
FIG. 11 shows an embodiment of a clock reproduction circuit.

FIG. 11 shows a block diagram of an embodiment of a clock reproduction circuit according to the present invention. The clock reproduction circuit reproduces a clock of the period $T_2$ from the reproduction pulse signal 104 produced from the shaping circuit 23 of FIG. 10. The following description deals with a modulation system having a clock of minimum pulse period of $T_2$ of the reproduction pulse signal 104, such as 4/5 MNRZi or 8/9 MNRZi. In spite of this, the present invention is of course applicable with equal effect also to a modulation system requiring the reproduction of $T_2/2$ clock such as MFM or ZM (zero modulation.

Generally, the reproduction pulse signal 104 has a pulse $T_2$ or more in duration, so that the clock is produced by the PLL during the missing clock period (shown in FIG. 14) containing no clock component. The PLL has also the function to reproduce a clock required for data production following the time variation of the reproduction pulse signal 104 in response to clock synchronization.

In FIG. 11, reference numeral 26 designates a multiplexer (MPX), numeral 27 a differentiator circuit, numeral 28 a $T_2/2$ delay circuti, numeral 29 a data clock generator circuit, numeral 30 a phase comparator, numeral 31 a low-pass filter (LPF), numeral 32 a voltage control oscillator (VCO), numeral 33 a multiplexer (MPX) numeral 34 an inverter, numeral 35 a detector circuit for the recorded sectors, numeral 36 a circuit for detecting the sync section 8a from the recorded sectors, and numeral 37 an LPF switching circuit for switching the band of the LPF 31.

Figure 12:
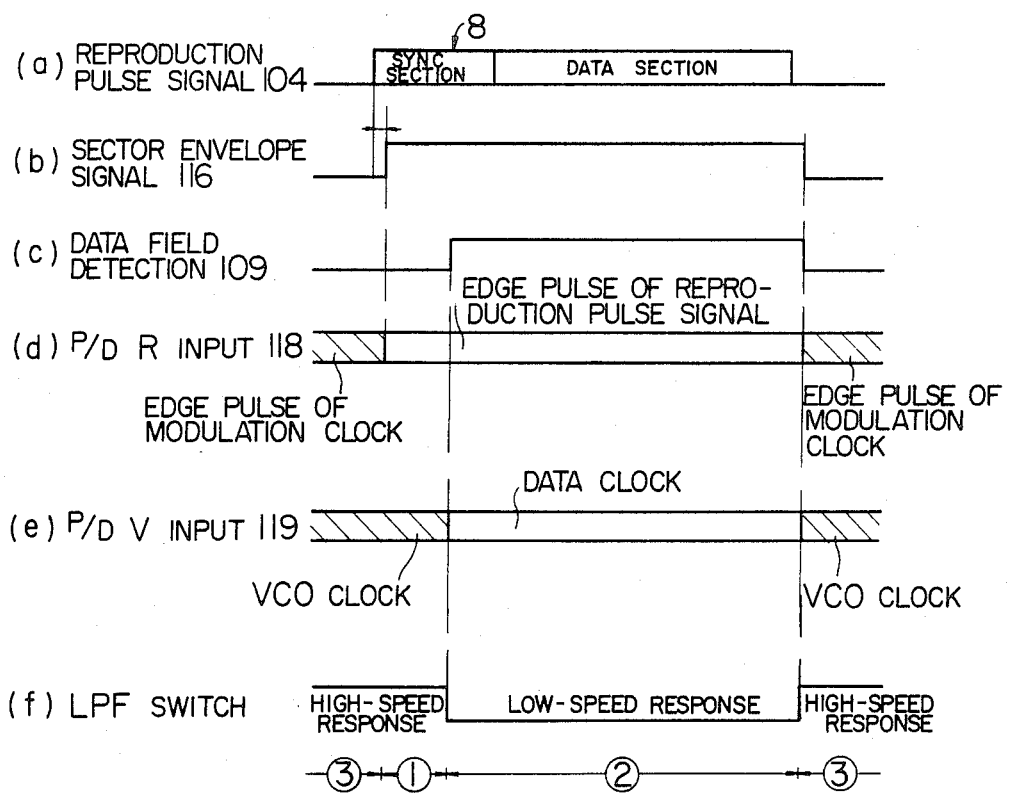
FIG. 12 is a timing chart for explaining the operation mode of the clock reproduction circuit.

Waveforms produced at various parts of the clock reproduction circuit of FIG. 11 are shown in FIG. 12. As shown in FIG. 12, the clock reproduction circuit comprises three control loops of ①, ② and ③. The first one is a sync loop represented by the period ①  in FIG. 12. This is a loop for clock pull-in of the PLL at the sync section 8a as a simplification loop. In other words, the R input 118 of the phase comparator 30 is applied as a signal produced from the reproduction pulse signal. This R input pulse 118 takes the form of a differentiation pulse 114 as converted into a pulse of $T_2/2$ duration at the delay circuit 28 and has the function to attain the maximum margin of $\pm T_2/2$ of the detection window at the time of demodulation. The V input 119 of the phase comparator 30, on the other hand, is the reproduction clock 112 from the VCO as inverted by the inverter 34. MPX 26 and MPX 33 select inputs by the sector envelope signal 116 produced from the recorded sector detector circuit 35 and the data field detection signal 109 produced from the sync section detector circuit 35 respectively.

The second one is a data loop represented by the period ② in FIG. 12. This loop is such that after the establishment of clock sync at the sync loop ①, the PLL operates correctly for the missing pulse (missing clock period) of the data section 8c, during which the data is demodulated. The R input 118 of the phase comparator 30 takes the same form as the sync loop 1 . On the other hand, the V input 119 takes the form of the data clock 115 produced from the data clock generator circuit 29 from the edge pulse 114 of the reproduction pulse signal 104 and the reproduction clock 112 instead of the inverted input of the reproduction clock 112.

Figure 13:
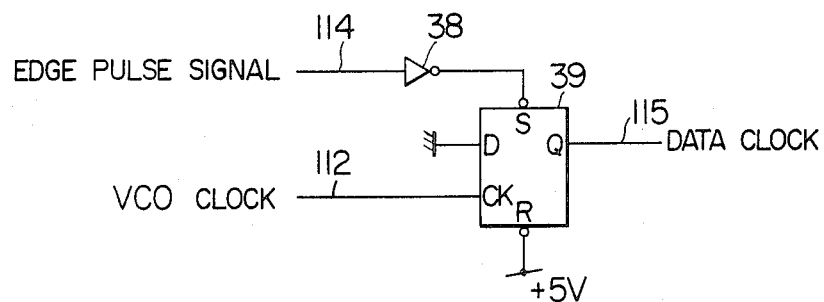
FIG. 13 shows a construction of a data clock generator circuit.
Figure 14:
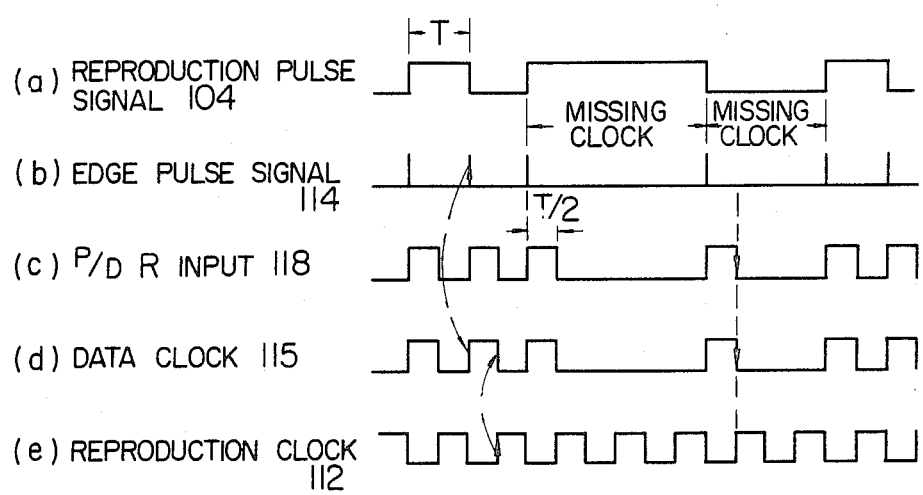
FIG. 14 shows signal waveforms produced at various parts of the data clock generator circuit.

FIG. 13 is a detailed diagram of the data clock generator circuit 29 including an inverter 38 and a D latch 39. FIG. 14 shows waveforms produced from the various parts of the circuit of FIG. 13. The data clock 115 is generated as the D latch 39 is set by the edge pulse 114 at the rise and fall of the reproduction pulse signal 104 and reset by the rise of the reproduction clock 112.

FIG. 3 shows a gap loop for the period ③ in FIG. 12. This period concerns an unrecorded portion free of the reproduction pulse signal 104, the burst dropout or the track address (TA) of a modulation system different from the sector modulation system. The recorded sector detector circuit 35 detects a recorded sector from the features of the sector modulation system and produces a sector envelope signal 116. Since the PLL exceeds the operation region of the input voltage 120 of the VCO 32 following the false signal, the delay of the clock pull-in at the next sector is prevented. On the other hand, in the absence of the sector envelope signal 116, the PLL is in free-running state. Especially when only the one sector is recorded in the track, the frequency of the reproduction clock 112 is displaced, thus making the clock pull-in unstable.

Figure 15:
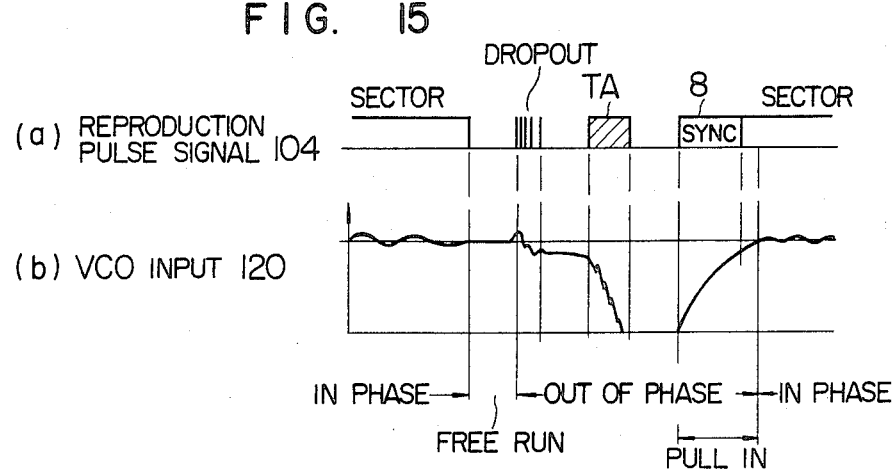
FIG. 15 shows a waveform of an ordinary VCO input voltage.

FIG. 15 is a diagram for explaining such a state and concerns the case in which the track address region (TA), unlike the sector modulation, has a frequency lower than the sector. In FIG. 15, the clock is out of phase at the long dropout and the track address region (TA). Especially at the track address region (TA), the input voltage 120 of the VCO is completely off, and the pull-in at the next sector fails to end in the sync section 8a of the sector.

In order to solve this problem in the gap loop, in the absence of the sector envelope signal 116, the modulation clock 113 of the sector modulator is applied to the R input 118 of the phase comparator 30 instead of the reproduction pulse signal 104 so as to hold constant the reproduction clock 112 produced from the VCO 32. The frequency difference between the modulation clock 113 and the clock for the reproduction pulse signal 104 is caused by the disc eccentricity or rotational variations and is very small, so that the pull-in improvement by the PLL is very effective.

Figure 16:
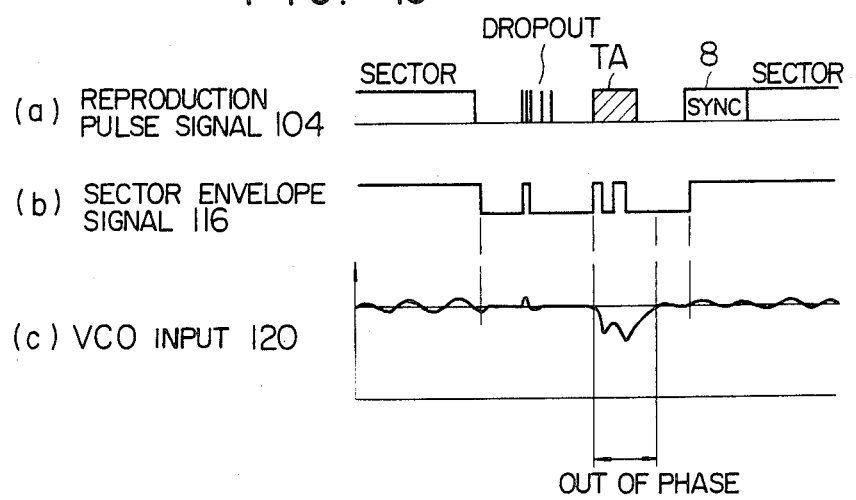
FIG. 16 shows waveforms of a VCO input voltage according to the present invention.

FIG. 16 shows examples of waveforms of the input voltage 120 applied to the VCO 32 of the clock reproduction circuit shown in FIG. 11. This diagram shows the case in which the sector envelope signal 116 is produced also at the track address region TA and the operation of the recorded sector detector circuit 35 is not sufficient. In the absence of the sector envelope signal 116, a gap loop is formed and therefore even when an out-of-phase condition ocurs at the track address region TA, a pull-in state is immediately attained to permit stable clock reproduction as shown.

The sync section detector circuit 36 of FIG. 11 produces a data field detection signal 109 indicating the detection of the sync section 8a of the sector. After completion of the pull-in of the PLL, the data field detection signal 109 is produced and applied to the LPF switching circuit 37 to thereby switch the response speed of LPF 31. In other words, when the data field detection signal 109 is not detected, rapid pull-in is attained with the operation of the PLL with a high speed response, and when the data field detection signal 109 is produced, the PLL operation is switched to a low speed response so that only a slow clock change such as a disc rotation variation is followed. The PLL response speed is changed by switching the cut off frequency of LPF 31 and LPF switch 37. By so doing, rapid pull-in and stable clock generation are accomplished at the same time.

Though obvious from the foregoing description, the effects of the present invention will be briefly described again below.

The modulation systems for the ID field and the data field are changed, and in addition, a modulation system for the ID field having no missing clock portion in the bit cell is employed. In this way, the ID field is detected with a high reliability free of the effects of dropout, and demodulation is effected rapidly for lack of the clock reproduction by the PLL or the like. Also, the ID field is short in length, and the interval between the ID field and the data field is shortened, resulting in a high format efficiency. Further, the employment of an ordinary high-density modulation system in the data section contributes to a higher density.

By selecting the maximum bit reversal interval of the data field and the minimum bit reversal interval of the ID field, these signals are easily separated to thereby facilitate reproduction without an erroneous operation.

It is obvious that the same advantage is obtained also when the modulation clock frequency of the ID field and the data field are changed.

Further, according to the present invention, in the clock reproduction for recording and reproduction of data by sector in an optical data carrier having no erasing function by means of laser beam, the increase of the clock pull-in time and the unstable clock reproduction caused at the unrecorded section, the dropout section or the track address region of a modulation system different from the data areas are obviated at the same time by switching the input to the clock reproduction circuit using a PLL among the reproduction pulse signal, the modulation clock and the LPF cut off frequency of the PLL depending on the presence or absence of the sector envelope signal of the recorded sector detector circuit and the data field detection signal of the sync section detector circuit.

We claim:

1. An optical data recording and reproducing apparatus comprising:
    an optical disc including grooved guide tracks having a recording material formed thereon traceable by a laser light beam, each said guide track being divided into a plurality of sectors, each sector including an identification field formed of concave-convex pits and a data field for recording data signals and having a uniform groove, said identification field including identification data indicative of an address of said sector and a flag indicative of initiation of the identification data and formed in front of the identification data, said identification field being recorded with a first modulation signal variable in dependence on a signal corresponding to a clock pulse, said data field being recorded with a second modulation signal different from the first modulation signal;
    a first demodulation means for demodulating the signals of said identification field; and
    a second demodulation means for demodulating said data signals when the output of said first demodulation means produces a predetermined address.

2. An optical data recording and reproducing apparatus according to claim 1, wherein said identification field includes signals modulated using phase encoding modulation.

3. An optical data recording and reproducing apparatus according to claim 1, wherein said identification field includes signals modulated using frequency modulation.

4. An optical data recording and reproducing apparatus according to any one of claims 1 to 3, wherein a minimum inversion interval of the second modulation signal of said data field is made larger than a maximum inversion interval of the first modulation signal of said identification field.

5. An optical data recording and reproducing apparatus according to claim 4, wherein an address mark of the data field is a signal including at least one of the digital numbers "11100" and "11000".

6. An optical data recording and reproducing apparatus according to claim 1, which further comprises:
    means for selectively detecting the recorded data field, and the identification field or a non-recording field;
    a phase lock loop for reproducing a clock signal from said data signals; and
    means responsive to the output of said detecting means for applying said data signals to a comparison input of a phase comparison circuit of said phase lock loop circuit when the data field is detected and for applying a modulation clock signal of the second modulation signal thereto when the identification field or the non-recording field is detected.

7. An optical data recording and reproducing apparatus according to claim 1, wherein the second modulation signal of said data field is formed by converting 4 data bits into a 5-bit modulation code, the 5-bit modulation code having a difference between the numbers of "1" and "0" of ±1 and a maximum inversion interval of a 4-modulation bit length.

8. An optical data recording and reproducing disc traceable by a laser beam light, comprising:
    a plurality of grooved guide tracks, each divided into a plurality of sectors, each sector including an identification field formed of concave-convex pits and a data field for recording data signals and having a uniform groove, said identification field including identification data indicative of an address of said sector and a flag indicative of initiation of the identification data and formed in front of the identification data, said identification field being recorded using a first modulation technique which modulates said identification data in dependence on a signal corresponding to a clock pulse, said data signals being recorded in said data field using a second modulation technique differnt from said first modulation technique.

9. An optical data recording and reproducing disc according to claim 8, wherein said identification field includes signals modulated using phase encoding modulation.

10. An optical data recording and reproducing disc according to claim 8, wherein said identification field includes signals modulated using frequency modulation.

11. An optical data recording and reproducing disc according to claim 8, wherein the minimum inversion interval of a modulation signal used in recording said data field is made larger than a maximum inversion interval of a modulation signal used in recording said identification field.

12. An optical data recording and reproducing disc according to claim 11, wherein an address mark of the data field is a signal including at least one of the digital numbers "11100" and "11000".

13. An optical data recording and reproducing disc according to claim 8, wherein a modulation signal of said data field is formed by converting 4 data bits into a 5-bit modulation code, the 5-bit modulation code having a difference between the numbers "1" and "0" of ±1 and a maximum inversion interval of a 4-modulation bit length.

* * * * *